US 6,714,701 B1

(12) United States Patent
Hazon et al.

(10) Patent No.: US 6,714,701 B1
(45) Date of Patent: Mar. 30, 2004

(54) OPTICAL SWITCH USING MICROMIRRORS AND METHOD OF TESTING THE SAME

(75) Inventors: Stephen C Hazon, Bishops Stortford (GB); Andrew J Bryant, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 144 days.

(21) Appl. No.: 09/867,176

(22) Filed: May 29, 2001

(51) Int. Cl.[7] ................................................. G02B 6/26
(52) U.S. Cl. ............................ 385/18; 385/16; 359/128
(58) Field of Search ..................... 385/16, 18; 359/117, 359/128

(56) References Cited

U.S. PATENT DOCUMENTS

| 5,699,462 A | * | 12/1997 | Fouquet et al. ............... 385/18 |
| 6,198,856 B1 | * | 3/2001 | Schroeder et al. ............. 385/16 |
| 6,222,954 B1 | * | 4/2001 | Riza ............................. 385/18 |
| 6,268,952 B1 | * | 7/2001 | Godil et al. ................... 359/291 |
| 6,278,812 B1 | * | 8/2001 | Lin et al. ....................... 385/18 |
| 6,292,600 B1 | * | 9/2001 | Goldstein et al. ............. 385/18 |
| 6,320,995 B1 | * | 11/2001 | Schroeder ..................... 385/18 |
| 6,519,383 B1 | * | 2/2003 | Cannell ........................ 385/18 |
| 2002/0012143 A1 | * | 1/2002 | Graves et al. ................. 359/128 |
| 2002/0064336 A1 | * | 5/2002 | Graves et al. ................. 385/17 |

* cited by examiner

Primary Examiner—Michael P. Stafira
Assistant Examiner—Juan D Valentin, II
(74) Attorney, Agent, or Firm—Barnes & Thornburg

(57) ABSTRACT

A MEMS micromirror optical switch is adapted to allow for easy testing either towards the end of the manufacturing process or during in-circuit operation. This is done by including additional micromirror arrays 22, 24. A test signal may be routed through the switching array using the test arrays 22, 24 without the need for disturbing optical fibers or any other signal interconnections. The enhanced optical switch may also be used for auto-discovery of connections through an optical node.

4 Claims, 7 Drawing Sheets

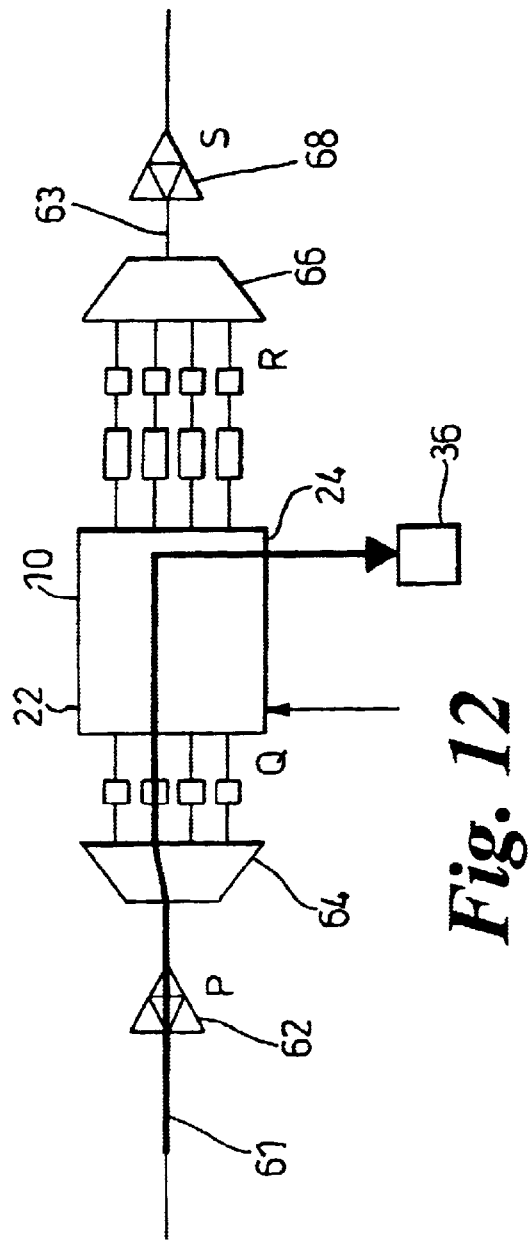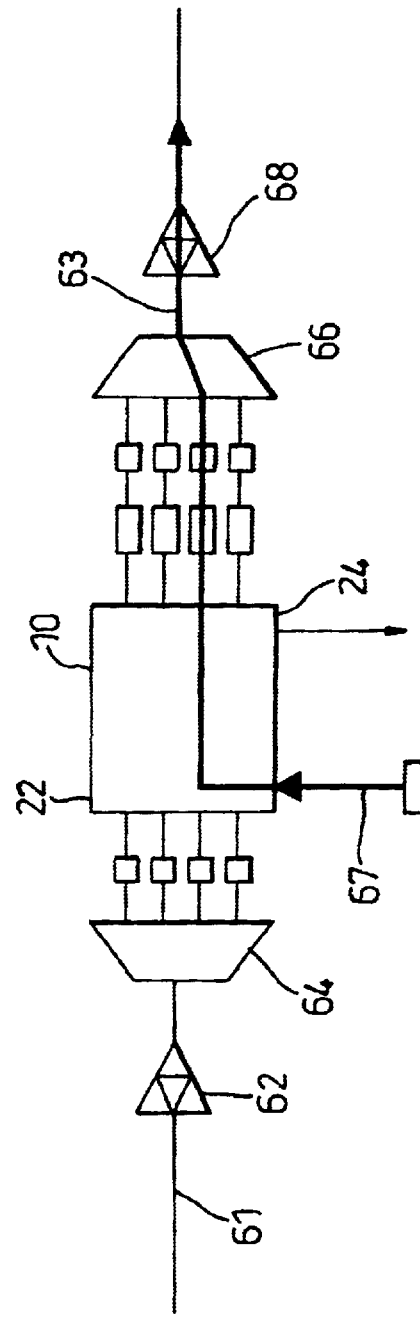

OPTICAL SWITCH USING MICROMIRRORS AND METHOD OF TESTING THE SAME

FIELD OF THE INVENTION

The invention relates to micro-electromechanical (MEM) micromirror type optical switches, in particular to the testing of the operation of such switches.

BACKGROUND OF THE INVENTION

Optical communication systems require high speed data, implemented as optical signals, to be switched between ports of a switching device to allow a signal routing function. Typically, the optical signals are carried by optical fibers, which connect to the optical switching device. There are currently a number of methods for achieving the required switching operation.

One solution comprises an electromechanical arrangement, where a signal in an optical fiber A is routed to fiber B by mechanically aligning fiber A with fiber B. This arrangement is bulky and mostly suited only to 1×N switch configurations.

An alternative solution is to use a hybrid optical switch in which the optical signals are first converted to electrical signals which are switched in a conventional manner. The resulting outputs of the switch are then converted back to optical signals. This adds complexity and noise to the switching operation.

Optical switches are also known in which a control signal is used to vary the path of an optical signal. For example, waveguide-based switches rely on the change of refractive indices in the waveguides under the influence of an external electric field, current or other signal.

Optical switches using an array of mirrors which can be mechanically tilted are also known. Small micromirrors (for example less than 1 mm) are arranged in a line or array, and the incident light signal is deflected by controlling the tilt angle of each micromirror. Mirror type optical switches include digital micromirror devices which tilt each micromirror by electrostatic force, piezoelectric drive micromirror devices which tilt each micromirror by a fine piezoelectric element and electromagnetic devices which rely upon electromagnetic and electrostatic forces.

In a typical micromirror device, a plurality of micromirrors are arranged in an array of N×M mirrors. Each micromirror can be controlled and is capable of switching between a first reflection state and a second non-reflection state. The optical signal is routed between an input and a selected output by controlling the reflection state of each mirror.

It has been recognised that testing of the operation of the micromirrors is desirable. U.S. Pat. No. 5,796,508 discloses a method for testing micromirrors of an array. The described method requires a test signal and test sensor to be connected to the array in place of the normal signal inputs and outputs. The mirrors are controlled in turn, and the test circuitry then determines whether or not the required routing operations are implemented. A problem with this technique is that the test circuitry must be coupled to the normal input and outputs of the device. This may not be possible after the optical switch is installed within a system. Furthermore, a test signal must be routed to each input of the switch, which increases the amount of required testing circuitry. It is also desirable to test the mirror array before completion of manufacture, for example before packaging of the array which involves providing the signal input and output connections. The prior art method uses the normal signal inputs and outputs and therefore requires a fully packaged array.

SUMMARY OF THE INVENTION

According to the first aspect of the invention there is provided an optical switch comprising a switching array of micromirrors having a plurality of inputs and a plurality of outputs, the micromirrors of the switching array each having first and second positions. A first test array of mirrors has a test input and a plurality of outputs, the first test array enabling a test signal to be routed to mirrors of the switching array. A second test array of mirrors has a test output, the test input of the first test array being routed to the test output when the mirror being tested is in one of the first and second positions.

The first test array enables a single test signal to be routed to a selected input of the optical switch, without disrupting the normal signal connections to the optical switch. This enables the optical switch to be tested easily before or after installation, and enables the optical switch to be fully tested using a single test signal input and output.

The outputs of the first test array may be aligned optically with the inputs to the switching array. Thus, the first test array comprises mirrors which are additional to the mirrors of the optical switch, and located at the input to the optical switch. The mirrors of the test array may, however, be formed on the same substrate and with the same processing steps as the mirrors of the optical switch.

Alternatively, the first test array can comprise mirrors of the switching array and comprise double-sided mirrors, the first test array then enabling a test signal to be routed to the remaining mirrors of the switching array.

The first test array further comprises a plurality of signal inputs. In normal operation (i.e. not during testing) the first test array is transparent to the input signals of the optical switch, so that normal operation of the switch is not affected by the first test array.

The first and second test arrays may be arranged on opposite sides or adjacent sides of the switching array. Depending on the configuration, correct operation of the mirror being tested may be determined either when the test signal reaches the test output, or else when the test signal is prevented from reaching the test output.

The invention also provides an optical switching system comprising:
  a plurality of optical switches of the invention;
  an input micromirror array having a combined test input and a plurality of outputs, each output being aligned optically with an input to the first test array of a respective one of the optical switches, thereby enabling the combined test input to be routed to the first test array of each optical switch; and
  an output micromirror array having a plurality of inputs from the second test arrays of each optical switch and a combined test output.

This system enables multiple optical switches within a system to be tested using a single test signal, which can be routed in turn to the optical switches.

The optical switch of the invention can be used in an optical node, for example comprising a demultiplexing unit receiving a group of WDM channels and for providing individual channels on individual optical fibers, the optical switch, a multiplexing unit having as inputs the outputs of the optical switch, the multiplexing unit combining the individual channels into a single WDM signal on an individual optical fiber.

According to a second aspect of the invention, there is provided a method of testing a mirror within a micromirror array optical switch, the method comprising:

applying a test signal to a first test array of mirrors;

positioning a mirror of the first test array in a predetermined position, thereby routing the test signal to a selected input of the optical switch, the mirror to be tested being associated with the selected input;

positioning the mirror to be tested of the optical switch in a testing position;

receiving a test output from a second test array of mirrors, the test signal being routed to the test output or being intercepted from being routed to the test output when the mirror being tested is in the testing position.

This testing method uses a single test signal applied to a single input of the first test array to enable the optical switch to be tested. The method can be adapted to enable multiple optical switches to be tested. In particular, a combined test signal can be provided to an input micromirror array which selectively routes the test input to a first test array of mirrors of a selected optical switch. The test output from the selected optical switch is provided to an output micromirror array which routes the test output from the selected optical switch to a combined test output.

When the optical switch of the invention is provided in an optical node, the test input and output enable testing of not only the correct operation of the mirrors in the optical switch, but also testing of the correct routing of channels through the node. The invention also provides methods of testing the connection of an optical switch within an optical communications system node, particularly for testing the routing through multiplexers and demultiplexers of the node.

The invention also provides an optical switch comprising a switching array of micromirrors having a plurality of inputs and a plurality of outputs, the micromirrors of the switching array each having first and second positions; and a test array of mirrors having a test input and a plurality of outputs, the test array enabling a test signal to be routed to mirrors of the switching array. This arrangement enables a test signal to be supplied into a network at the optical switch, without disrupting the normal signal connections within the network.

The invention also provides an optical switch comprising a switching array of micromirrors having a plurality of inputs and a plurality of outputs, the micromirrors of the switching array each having first and second positions; and a test array of mirrors having a number of inputs connected to or optically aligned with the outputs of the switching array, and a test output. This arrangement enables a test signal to be tapped out of the optical switch of a network for monitoring, without disrupting the normal signal connections within the network.

BRIEF DESCRIPTION OF THE DRAWINGS

Examples of the invention will now be described in detail with reference to the accompanying drawings, in which:

FIG. 12 is a schematic of the construction of an optical node with signal routing for ingress auto-discovery;

FIG. 13 is a schematic of the construction of an optical node with signal routing for egress auto-discovery.

The same reference numbers are used in different Figures to denote the same components.

DETAILED DESCRIPTION

Figure 1:
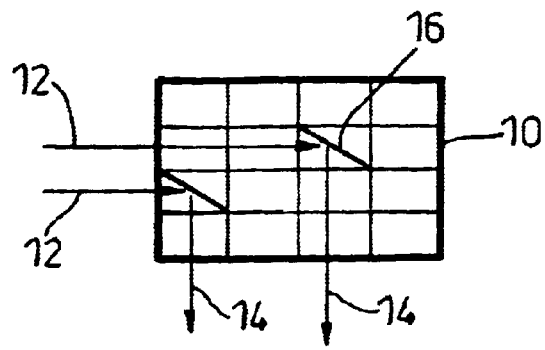
FIG. 1 shows a MEMS micromirror switching array and is used to explain the operation of the array.

The MEMS micromirror switching array 10 shown in FIG. 1 comprises an array of small (typically less than 1 mm) mirrors arranged in orthogonal rows and columns. The inputs 12, 18 to the switching array are provided at one edge of the array, and the signal outputs 14, 20 from the array are collected from an orthogonal edge. Of course, the signals do not necessarily need to be reflected by 90 degrees, and mirror arrangements may provide different angles between the input and output optical paths. Each mirror is moveable between first and second positions. In one of the positions, the mirror lies outside the path of an incident optical signal, whereas in the other of the positions, an incident optical signal is reflected by the mirror to an associated output. The micromirror switching array 10 is fabricated using standard lithographical and semiconductor processing techniques which will be known to those skilled in the art.

For the purposes of clarity, the position in which an incident optical is reflected will be defined as the "first position", and the position in which the mirror is out of the path of the incident signal will be defined as the "second position". In FIG. 1, two individual mirrors 16 are shown in the first position, and this results in an input signal 12 being directed to a selected output.

Figure 2:
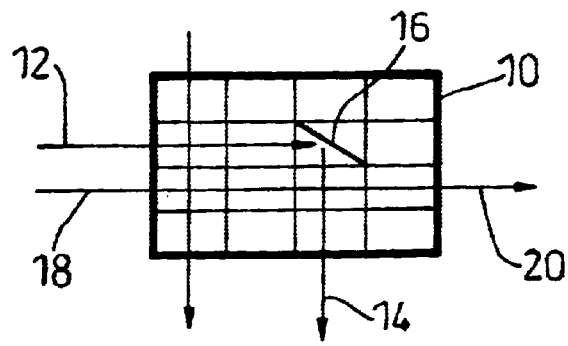
FIG. 2 shows the MEMS micromirror switching array of FIG. 1 with different mirror settings.

As shown in FIG. 2, if an input signal 18 is provided to a row in which all mirrors are in the second position, the input signal continues in a straight line through the switching array 10 and exits as signal 20 at an opposite edge of the array. This routing will be used in some examples of the invention, as will become apparent from the following description.

Figure 3:
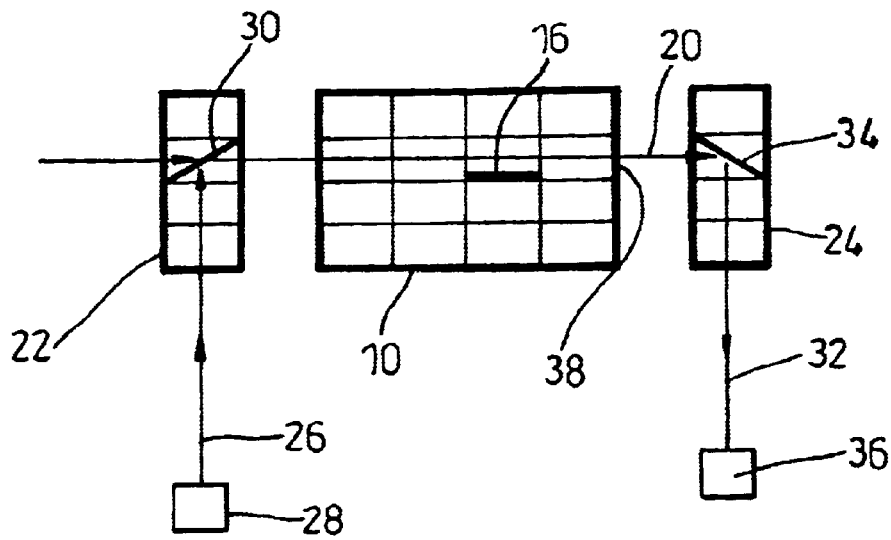
FIG. 3 shows a first example of optical switch according to the invention.

An improved MEMS system in accordance with the invention which allows testing of each individual micromirror 16 is shown in FIG. 3. A first test array of micromirrors 22 and a second test array of micromirrors 24 are fabricated on opposite sides of the switching array 10. These may be manufactured as an integral part of the switching array 10 or may be located at some distance from the edge of the switching array 10.

The first test array 22 enables a test signal (test input) 26 to be routed to mirrors of the switching array 10, and the second test array has a test output 32. The test input 26 is routed to the test output 32 when all mirrors in a row including a mirror being tested 16 are in the second position. In the second position, a signal can pass the mirror both in the row and column directions. Therefore, a mirror is not normally represented when in the second position. However, in FIG. 3, one mirror 16 is actually shown, and it is represented as lying flat to allow the signal to pass in the row direction. This is for representation only, and does not mean it will interrupt light in the column direction.

The first test array 22 may be considered as an input test array. Each individual micromirror in the test array 22 can be moved into a first or second position, the definition of these being the same as for the switching array. The input test signal 26 from a single input test light source 28 is reflected by an individual micromirror 30 in the first test array 22 and directed to a selected row (i.e. a selected input) of the switching array 10. When all mirrors in the row are in the second position, the output signal 20 results, and is directed into the second test array 24. This signal is reflected by a mirror 34 in the second test array 24, towards a single test detector unit 36.

In a preferred embodiment of the invention, the input light source 28 and the output test detector 36 comprise a modulated light emitting diode or laser, and a pin diode respectively. These may be fabricated on the same substrate as the MEMS switching array 10, and the test arrays 22 and 24. Alternatively, the light source 28 and detector 36 may be discrete components.

Testing of the individual micromirrors in the switching array 10 is carried out as follows. A row of mirrors 38 is to be tested. An individual mirror in the first test array 22 is moved to the first position, such that the input test signal 26 is directed along the row of mirrors 38. Each mirror in the row 38 is switched in turn from the second to the first position (with all other mirrors in the row in the second position). With the mirror 16 being tested in the first position, no signal should reach detector 36. If an output test signal 32 is observed then the individual micromirror 16 has failed to switch from second position to the first position and a failure of that micromirror should be recorded.

It is also necessary to test the operation of the micromirrors in the first test array 22 and the second test array 24. A pair of mirrors, one from the first test array 22 and one from the second test array 24 are switched to the first position. These mirrors are chosen such that the operator would expect to see an output signal at the detector 36 for the case when all of the micromirrors in the switching array 10 are in the second position. Once this path has been established, the mirrors of the test arrays can be tested. Switching the mirror in the first test array 22 or the second test array 24 from the first to the second positions will remove the output test signal 32. If this does not happen, then the selected mirror in the first test array, the selected mirror in the second test array or both have failed to operate correctly.

Figure 4:
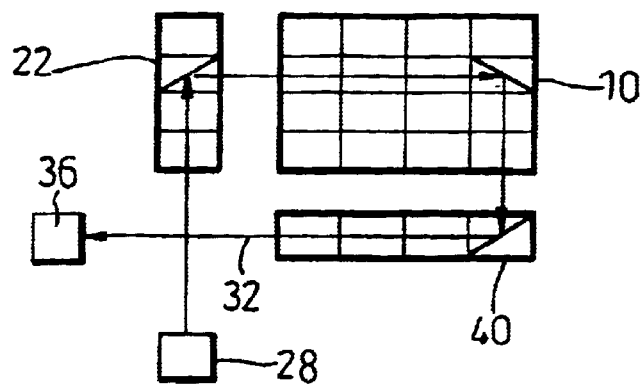
FIG. 4 shows a second example of optical switch according to the invention.

FIG. 4 shows an alternative arrangement in which the second test array 40 is positioned on an adjacent side of the switching array 10 to the first test array 22. This means the test signals are routed between the normal signal inputs and outputs of the switching array. In this case, when a mirror being tested is in the first position, the test signal should be routed to the second test array 40. Although the second test array is at the output of the switching array, it does not interfere with the normal operation of the device, because all mirrors in the test array will be in the second position (i.e. allowing an input signal to pass) when the device is in normal use. During testing, detection of an output test signal indicates correct operation of the individual micromirrors in the switching array 10.

Figure 5:
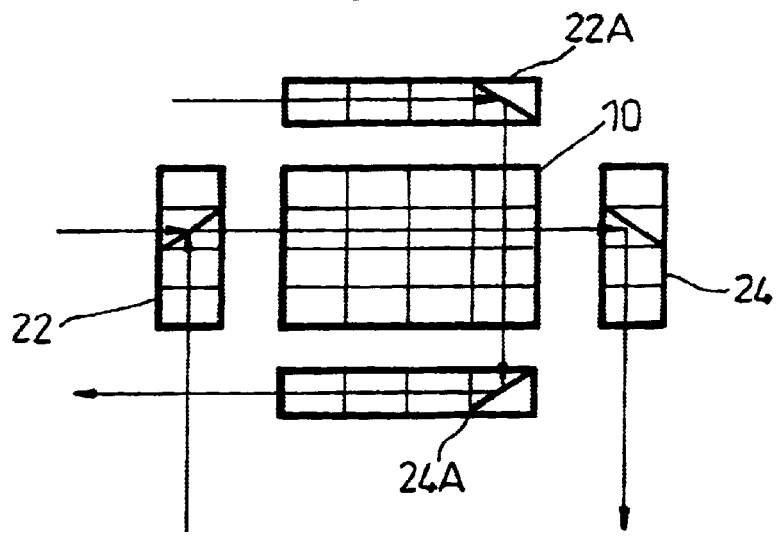
FIG. 5 shows a third example of optical switch according to the invention.

FIG. 5 shows an alternative arrangement in which testing arrays are located on all four sides of the switching array 10, effectively providing two test paths through the mirrors of the switching array. One test path is between a first pair of testing arrays 22, 24 (or 22 and 24A), and the second test path is between a second pair of testing arrays 22A, 24A. This may enable testing to continue even in the event of failure of a mirror in one of the testing arrays.

Figure 6:
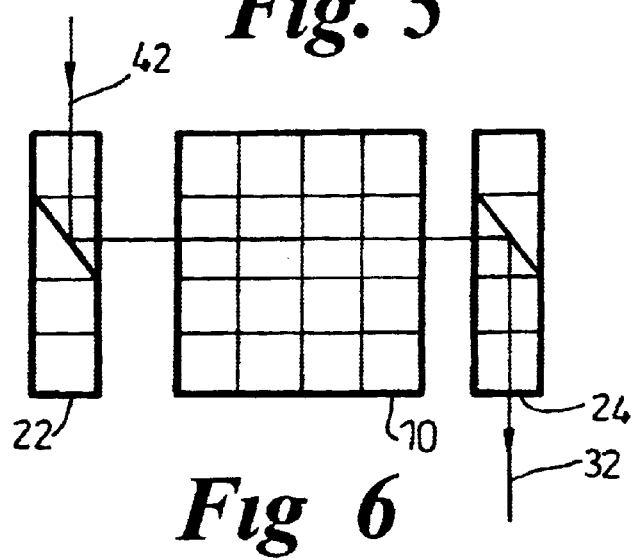
FIG. 6 shows a fourth example of optical switch according to the invention in which the reverse side of the micromirrors in the first test array are reflecting.

In the examples above, the mirrors of the first test array are arranged in a different orientation to the mirrors of the switching array, allowing the mirrors of the first test array to be reflecting on the same side as the mirrors of the switching array. FIG. 6 shows an embodiment of the invention in which the reverse sides of the micromirrors in the first test array 22 are reflecting. This allows all of the mirrors in the first test array 22, the switching array 10 and the second test array 24 to be fabricated in the same orientation. In this case, the direction of the input test signal 42 is opposite to that of earlier mentioned embodiments.

Figure 7:
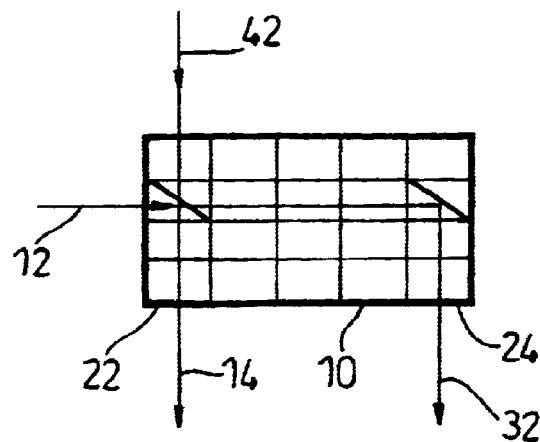
FIG. 7 shows a fifth example of optical switch according to the invention in which both sides of the mirrors in the first column of the switching array are reflecting, and that column is used to switch input signals or test signals.

In the examples above, the testing arrays comprise additional mirrors to the mirrors of the switching array (although they may be physically in the same array and formed on the same substrate). An alternative is to incorporate the first test array into the switching array as shown in FIG. 7. The mirrors in the first column of the switching array are reflecting on both sides. This first column then defines the first testing array, but is also part of the normal switching array. Thus, the first column of the switching array 10 can still be used to switch an input signal 12 to an output 14. In addition, the first column of mirrors can route a testing signal 42 to the second testing array 24.

Figure 8:
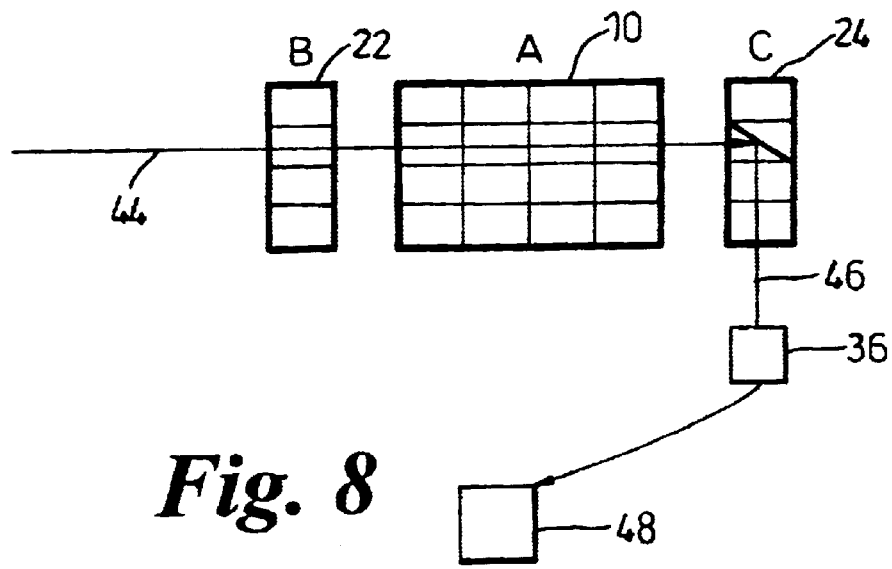
FIG. 8 is used to explain use of the optical switch of the invention for detecting input connections.

The additional testing arrays of the invention also enable determination of the connections to or from the switching array. FIG. 8 shows an arrangement for determining the input connections to the switching array. In the preferred embodiment, these would be optical fibers carrying input signals 44.

At the start of the test, each of the mirrors in the first test array 22 is in the second position. An input signal 44 is provided to a input fiber (it may not yet be known to which input of the switching array the input fiber is connected). Each of the mirrors in the switching array 10 is in the second position. The mirrors in the second test array are switched in turn between the second and first positions. An output signal 46 is detected by the detector 36 when the mirror in the second test array, which is in the first position, is on a corresponding row to the input signal 44. The detected signal is recognised by a control system 48 which reports details of the connection to the operator. This procedure uses the output test array 24 to enable the test input to be detected without disturbing the normal signal connections to the switching array.

Figure 9:
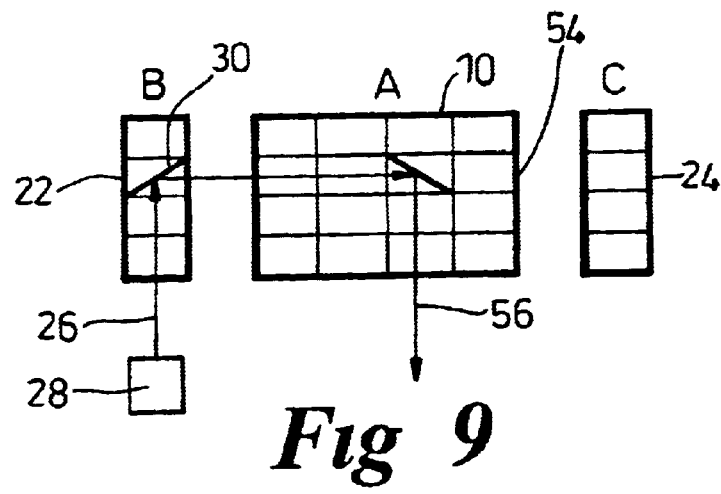
FIG. 9 is used to explain use of the optical switch of the invention for detecting output connections.

The device of the present invention can also be used to enable output connections to be determined. In FIG. 9, an input test signal 26 from a single input test light source 28 is reflected by an individual micromirror 30 in the first test array 22 and directed into the switching array 10. The mirrors in the second test array 24 are in the second position. The mirrors in the row 54 of the switching array 10 corresponding to that of the switched mirror in the first testing array are switched in turn between the second and first positions. Each mirror in the row 54 will route the test signal 36 to a different output. By detecting which output fiber has a signal on it, it is possible to determine to which output port of the switching device the output fiber is connected. The detected signal is again recognised by a control system which reports details of the connection to the operator. This procedure uses the input test array 22 to enable the test input to be provided without disturbing the normal signal connections to the switching array.

The examples above enable a single test signal and a single detector to be used for testing all mirrors of the switching array. It is also possible to provide a single test signal and detector for a number of switching arrays. Typically, a number of optical switches will be provided within a optical component such as a communications node, and these optical switches can then be tested in one operation with minimum additional hardware.

Figure 10:
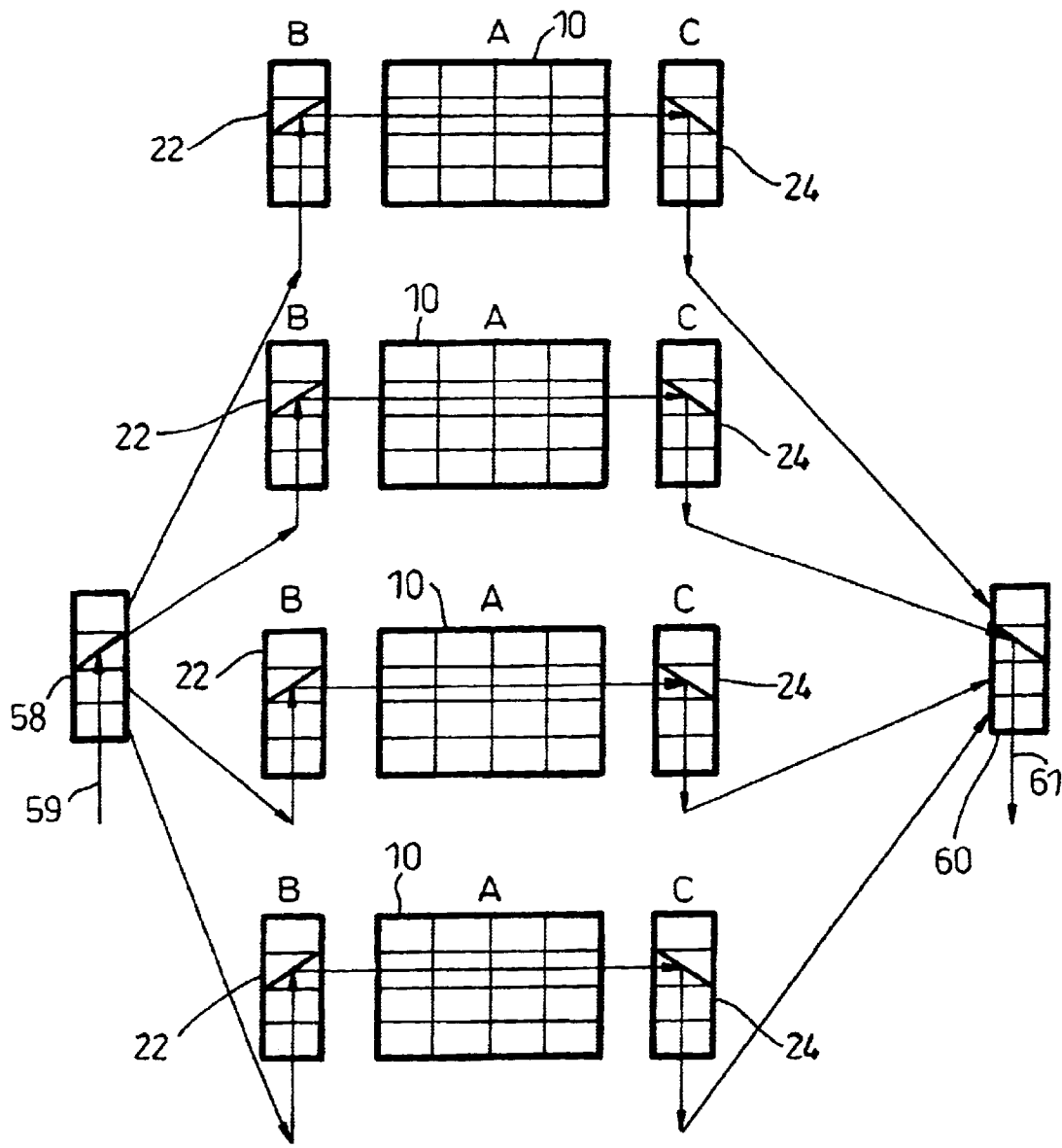
FIG. 10 shows a first example of a system in which a test signal is used for multiple arrays.

FIG. 10 shows a multiple switching system comprising a plurality of switching arrays 10, each with a first test array 22 and second test array 24. An additional input micromirror array 58 is required. This has a combined test input 59 and a plurality of outputs, each output being aligned or connected optically with the test input to the first test array 22 of one of the optical switches. This is designed to allow the combined test input 59 to be routed to the first test array of each optical switch, in turn. In addition, there is an output micromirror array 60 having a plurality of inputs from the second test arrays 24 of each optical switch, and a combined test output 61. This use of the input micromirror array 58 and the output micromirror array 60 allows for testing of the whole system with a single test light source and test detector.

Figure 11:
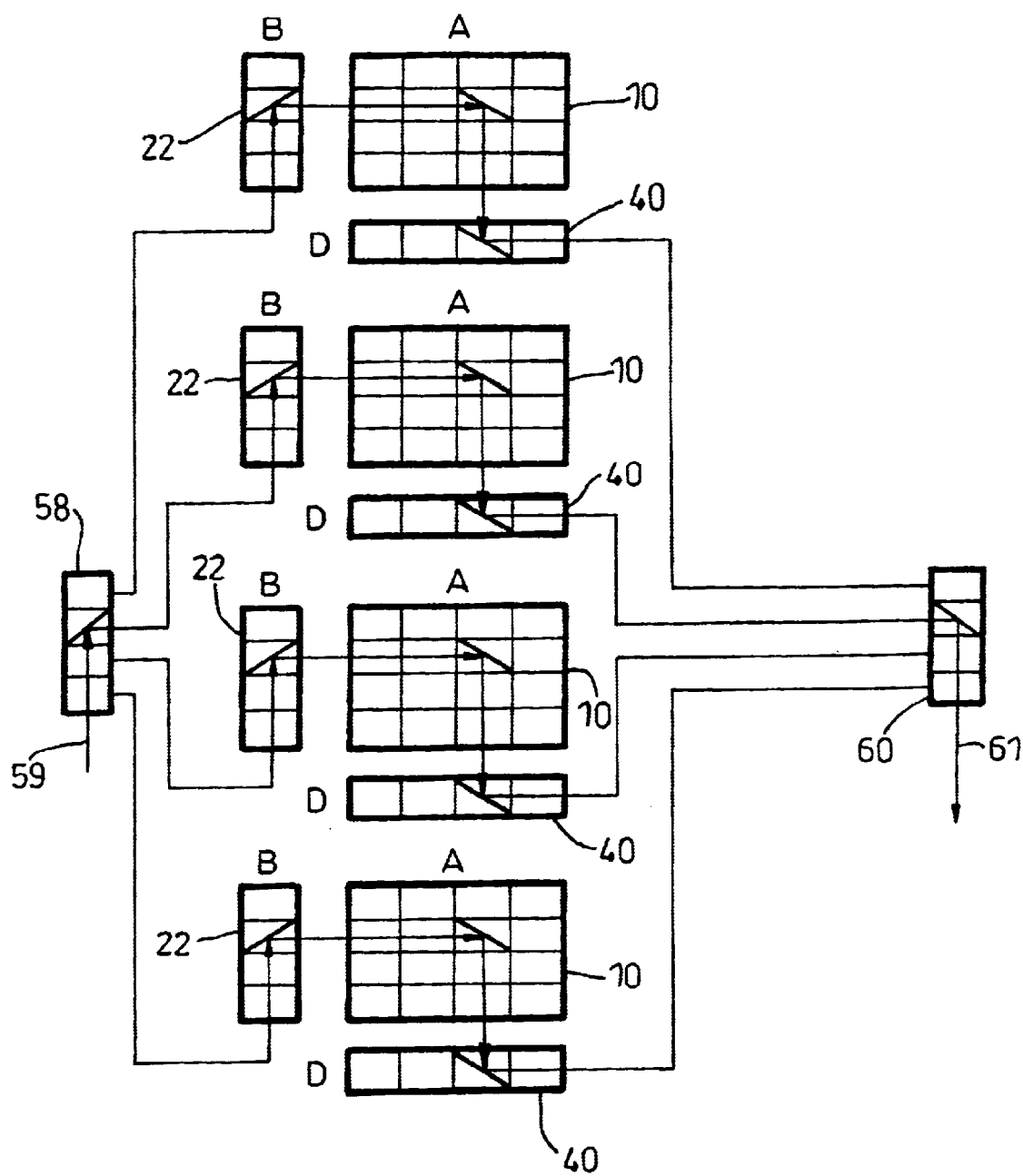
FIG. 11 shows a second example of a system in which a test signal is used for multiple arrays.

The arrangement of FIG. 10 uses the layout of FIG. 3 for the individual optical switches. Instead, the layout of FIG. 4 may also be used, as shown in FIG. 11.

As described above, the testing arrays provide by the invention enable connections to be determined. The optical switch may in one preferred implementation comprise part of an optical node in an optical communications system. The invention may also be used to enable the signal routing through an optical node and problems in an optical node during operation to be determined, thus providing an auto-discovery system.

As shown in FIG. 12, each node comprises a preamplifier 62, a demultiplexing unit 64, an optical switching array 10 of the invention, a multiplexing unit 66 and a post amplifier 68. A group of WDM channels 61 entering the node is amplified by the preamplifier 62 and then divided into individual channels, each on an optical fiber. These fibers form the input to the switching array 10, which performs routing functions. Although not shown, the node may also provide add/drop capability.

The outputs are then passed through the multiplexing unit 66 to combine the individual channels in to a single WDM signal on a single optical fiber. This signal 63 is then passed through the post-amplifier 68.

Each port of the multiplexer and demultiplexer is associated with an allocated wavelength. Therefore, connections within the node must be tested using appropriate wavelength test signals. As above, the architecture of the invention enables both input and output auto-discovery. Input auto-discovery is carried out by injecting a test signal 61 through the preamplifier 62 and the demultiplexing unit 64 and into the optical switching array, as shown in FIG. 12. The second test array 24 is used to intercept the test signal, diverting it out of the node to detector 36. Knowledge of the configuration of the mirrors in the second test array 24 provides information on the input port of the test signal into the switching array. Each test signal is tagged for easy identification. Tag readers are located before the demultiplexer and between the demultiplexer 64 and the optical switching array 10, and at the test detector 36. This allows for concurrent testing using multiple wavelengths.

As shown in FIG. 13, output auto-discovery is carried out by injecting a test signal 67 into the first test array 22. The test signal is directed into the switching array 10, then out of the node via the multiplexer 66 and post amplifier 68. Each signal is again tagged for easy identification, and further tag readers are located between the switching array 10 and the multiplexer 66, and in the post amplifier 68. The tags are read to discover the output port from the switching array.

Figure 14:
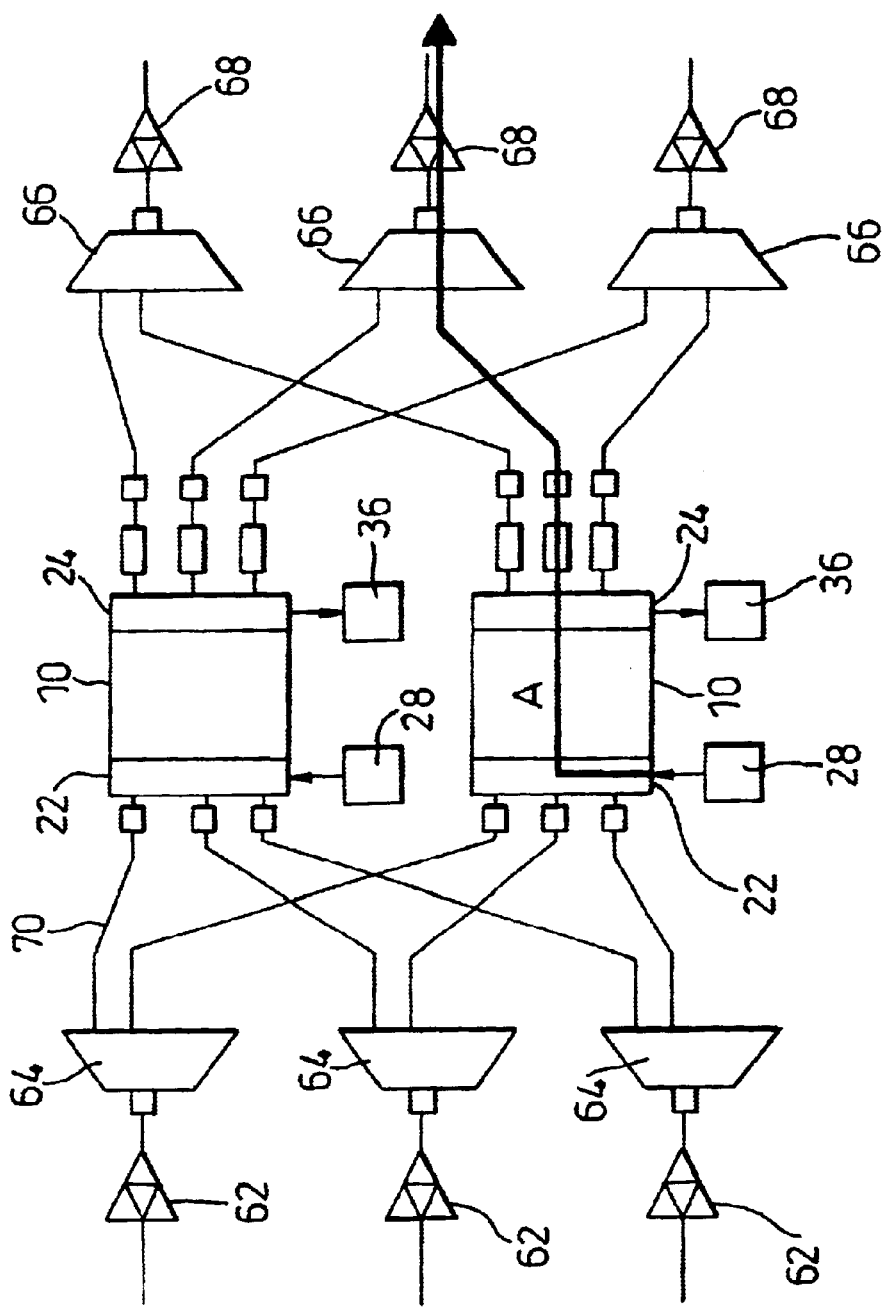
FIG. 14 shows a multiple switch and port system using optical switches of the invention.

The tagging of the test signal (in addition to the fact that the test signal has a specific wavelength) also enables testing of more complicated node architectures. FIG. 14 shows a system comprising a plurality of switching arrays 10 and a plurality of WDM ports. Connections within the system are made by optical fibers, for example 70. It is very helpful to be able to determine the routing of a signal through the node. Auto-discovery with tag reading can be used to indicate incorrect connections of fibers, operation of the micromirrors in the switching array and other routing issues.

The tagging and injection of the test signal also allows testing and verification of the link from one optical node to another. The test signal is allowed to propagate across the network to another node where it is detected by the tag readers, and possibly routed to the detector 36. This allows network topology discovery in a transparent optical mesh network without necessitating the addition of lossy injector couplers and optical splitters in the line.

Essentially, the device of the invention provides access to each switching array to enable test signals to be routed into or out of the switching arrays without disrupting physical fiber connections, to enable connections to be tested within simple or complex switching architectures.

Although the present invention and the preferred embodiments have been fully described, various changes and modifications will be apparent to those skilled in this field.

We claim:

1. An optical switching system comprising:
    a plurality of optical switches, each optical switch comprising:
        a switching array of micromirrors having a plurality of inputs and a plurality of outputs, the micromirrors of the switching array each having first and second positions;
        a first test array of mirrors having a test input and a plurality of outputs, the first test array enabling a test signal to be routed to mirrors of the switching array; and
        a second test array of mirrors having a test output, the test input of the first test array being routed to the test output when the mirror being tested is in one of the first and second positions;
    an input micromirror array having a combined test input and a plurality of outputs, each output being aligned optically with an input to the first test array of a respective one of the optical switches, thereby enabling the combined test input to be routed to the first test array of each optical switch; and
    an output micromirror array having a plurality of inputs from the second test arrays of each optical switch and a combined test output.

2. A method of testing an optical switching system comprising:

a plurality of optical switches, each optical switch comprising:
   a switching array of micromirrors having a plurality of inputs and a plurality of outputs, the micromirrors of the switching array each having first and second positions;
   a first test array of mirrors having a test input and a plurality of outputs, the first test array enabling a test signal to b routed to mirrors of the switching array; and
   a second test array of mirrors having a test output, the test input of the first test array being routed to the test output when the mirror being tested is in one of the first and second positions;

the method comprising:
   providing an input micromirror array having a combined test input and a plurality of outputs, each output being aligned optically with an input to the first test array of a respective one of the optical switches, thereby enabling the combined test input to be routed to the first test array of each optical switch; and
   providing an output micromirror array having a plurality of inputs from the second test arrays of each optical switch and a combined test output;
   inputting an optical test signal at the combined test input;
   monitoring an output signal at the combined test output; and
   controlling the input micromirror and output micromirror thereby to test at least two of said plurality of optical switches.

3. An optical network comprising at least two nodes,
   wherein the first node includes at least one optical switch comprising a switching array of micromirrors having a plurality of inputs and a plurality of outputs, the micromirrors of the switching array each having first and second positions and a test array of mirrors having a test input and a plurality of outputs, the test array enabling a test signal to be routed to mirrors of the switching array,
   wherein the second node includes at least one optical switch comprising a switching array of micromirrors having a plurality of inputs and a plurality of outputs, the micromirrors of the switching array each having first and second positions and a test array of mirrors having a number of inputs connected to or optically aligned with the outputs of the switching array, and a test output,
   wherein a test signal can be provided at the test input of the first node and a monitoring arrangement is provided for monitoring the signal at the test output of the second node.

4. A method of testing a path between two nodes of an optical network, the method comprising
   providing a first node having at least one optical switch comprising a switching array of micromirrors having a plurality of inputs and a plurality of outputs, the micromirrors of the switching array each having first and second positions and a test array of mirrors having a test input and a plurality of outputs, the test array nabling a test signal to be routed to mirrors of the switching array,
   providing a second node having at least one optical switch comprising a switching array of micromirrors having a plurality of inputs and a plurality of outputs, the micromirrors of the switching array each having first and second positions and a test array of mirrors having a number of inputs connected to or optically aligned with the outputs of the switching array, and a test output,
   inputting an optical test signal at the test input of the first node; and
   monitoring an output signal at the test output of the second node.

\* \* \* \* \*